July 29, 1930. C. E. CHALMERS 1,771,873
COIN CHANGING DEVICE
Original Filed Sept. 22, 1922 10 Sheets-Sheet 1

Inventor
Charles E. Chalmers
By his Attorney
Wm Bohleber

July 29, 1930.  C. E. CHALMERS  1,771,873
COIN CHANGING DEVICE
Original Filed Sept. 22, 1922   10 Sheets-Sheet 4
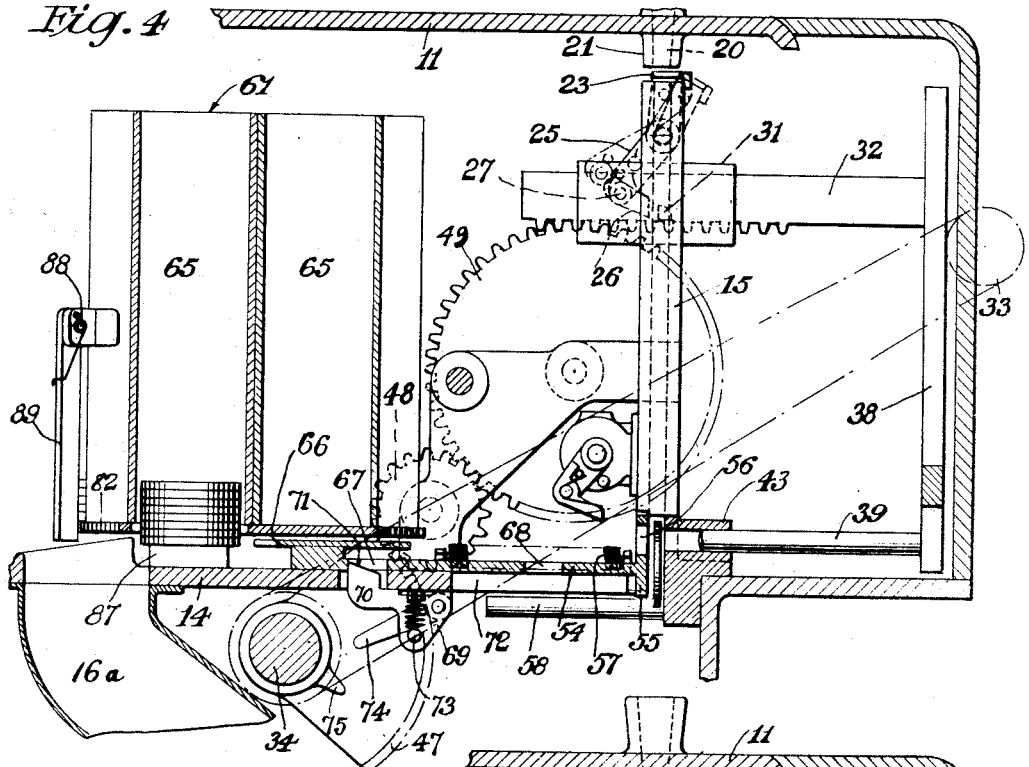
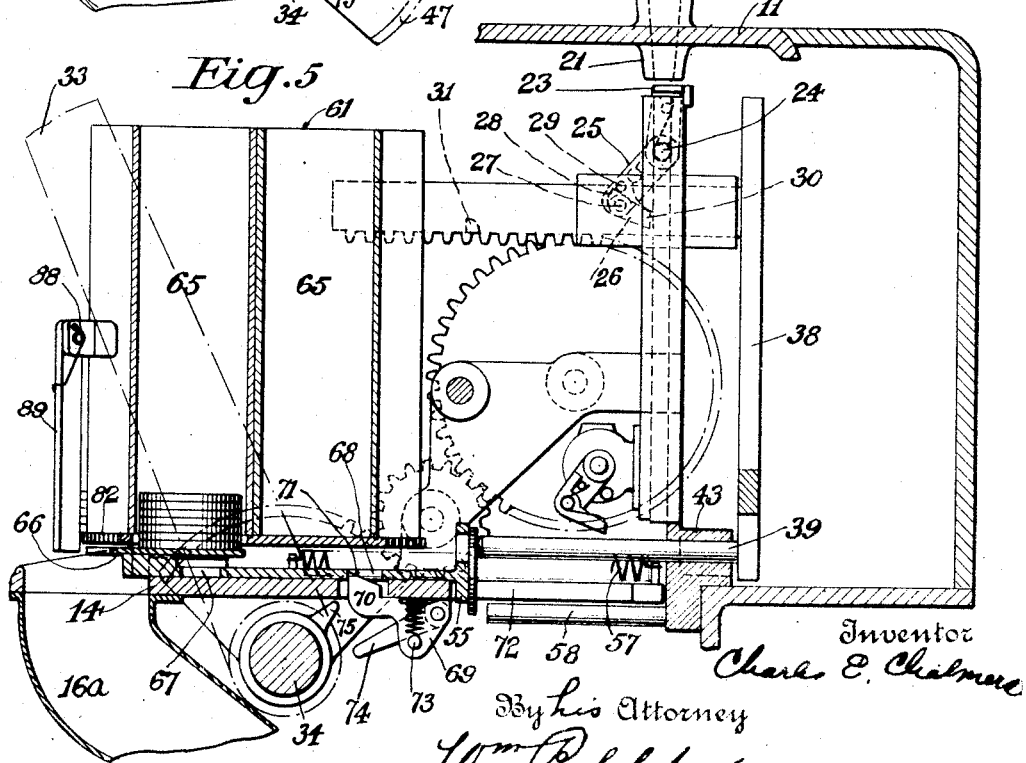

July 29, 1930.  C. E. CHALMERS  1,771,873
COIN CHANGING DEVICE
Original Filed Sept. 22, 1922   10 Sheets-Sheet 5
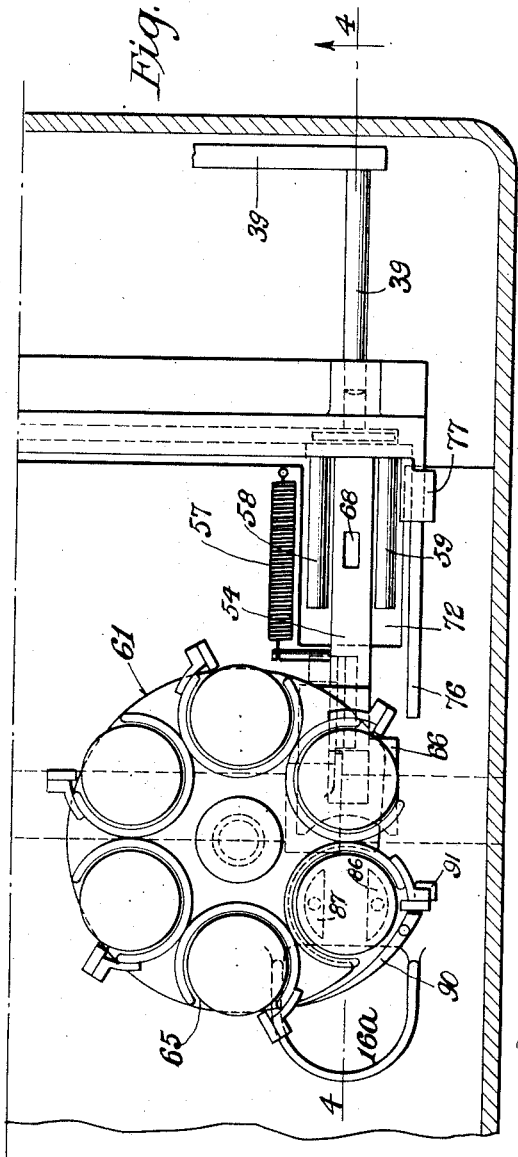
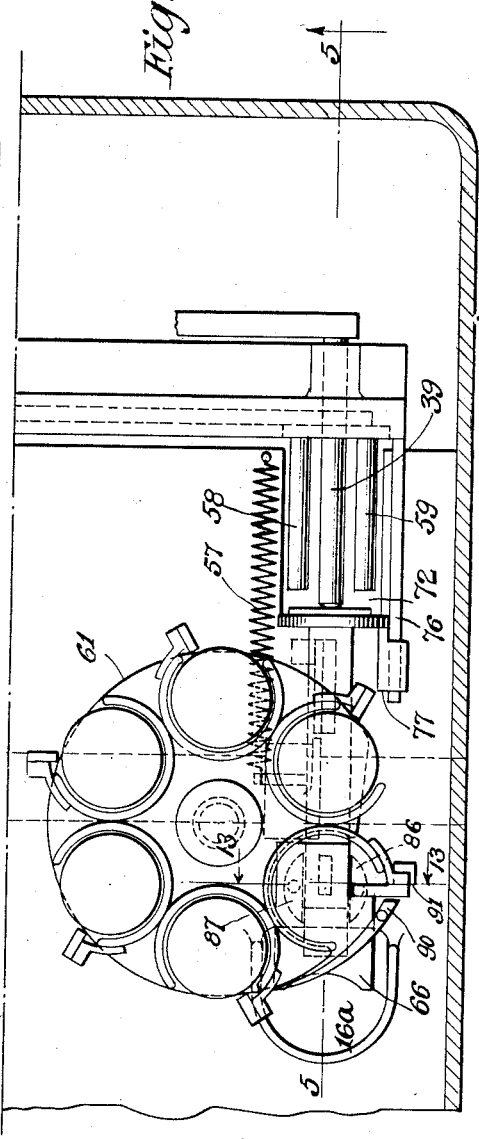
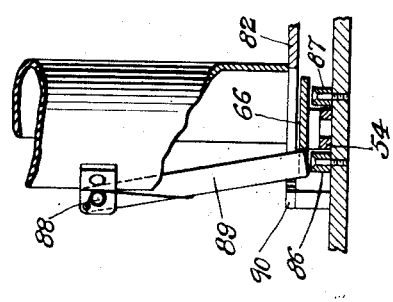

July 29, 1930.  C. E. CHALMERS  1,771,873
COIN CHANGING DEVICE
Original Filed Sept. 22, 1922   10 Sheets-Sheet 6
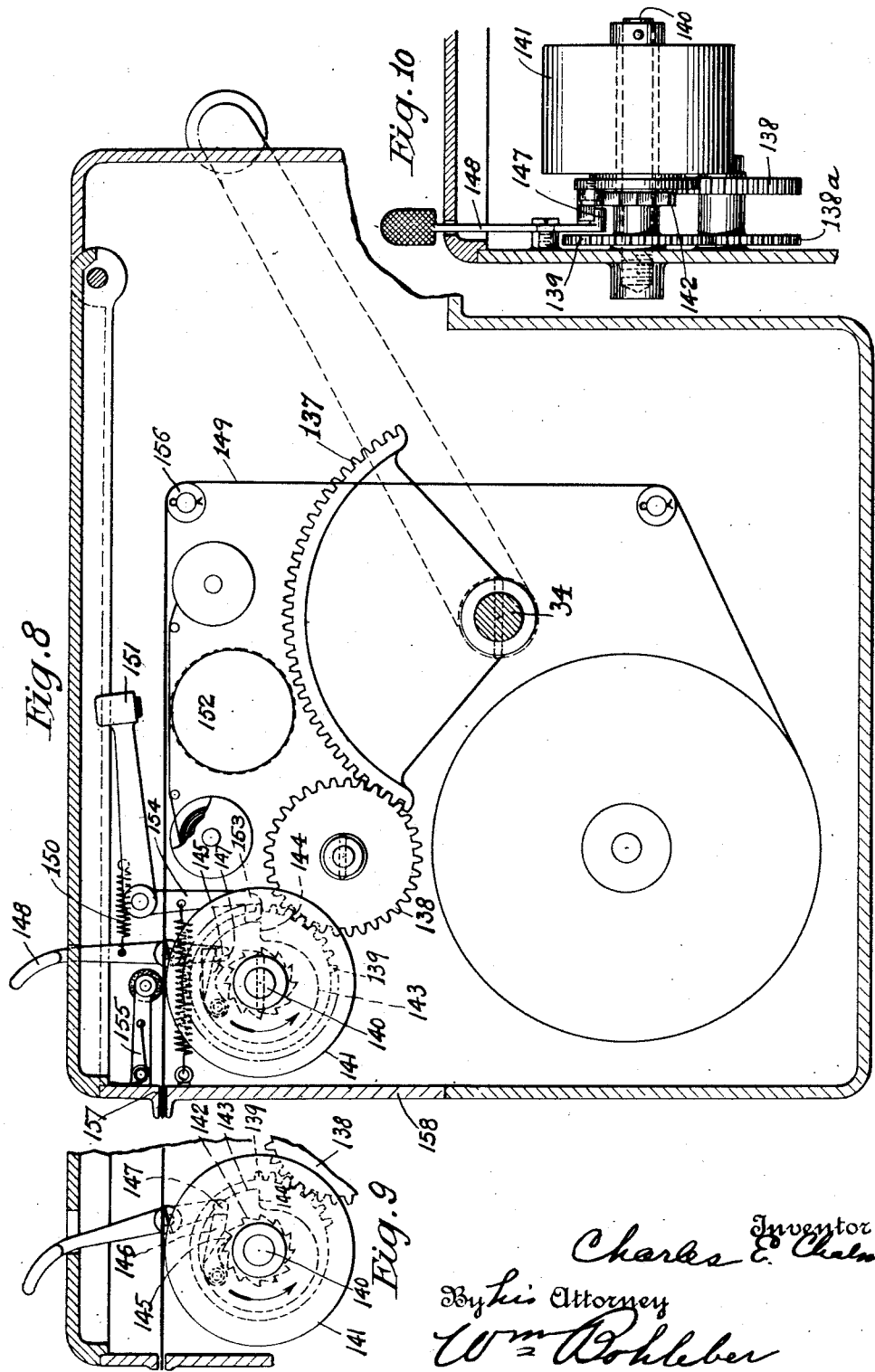

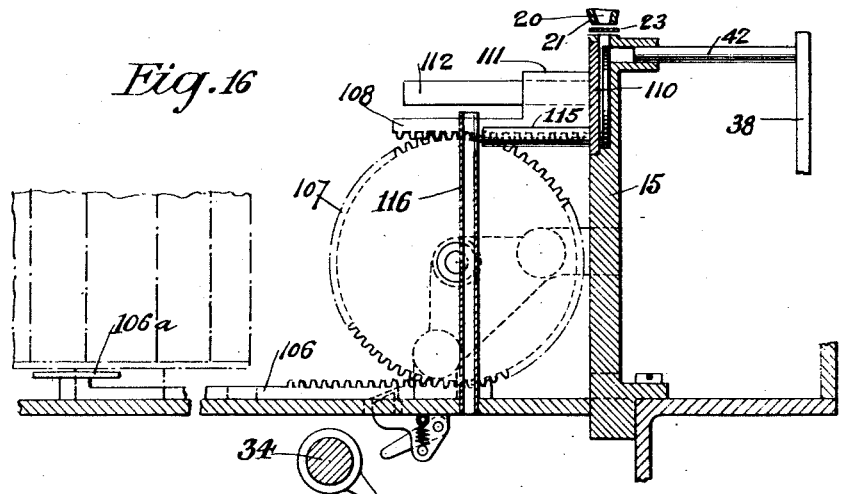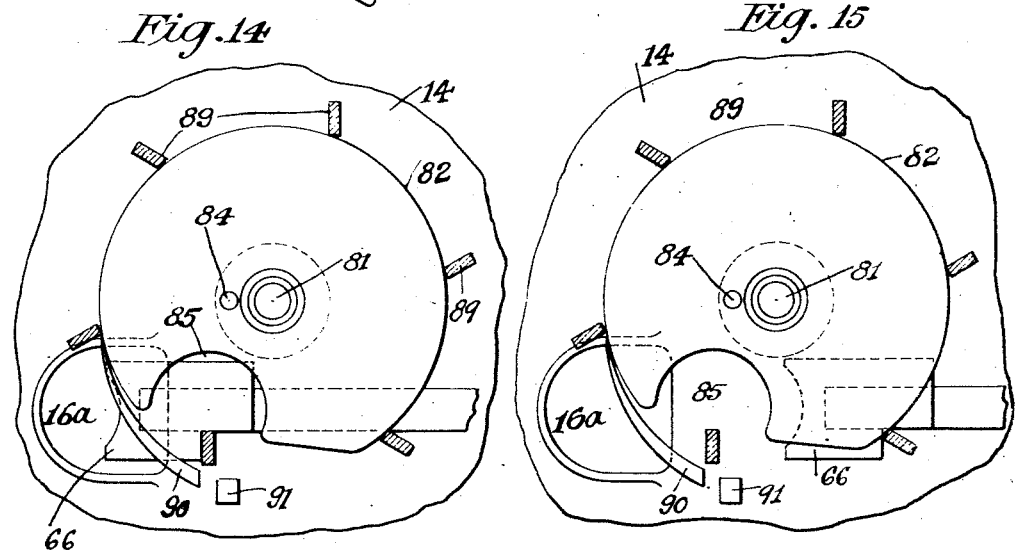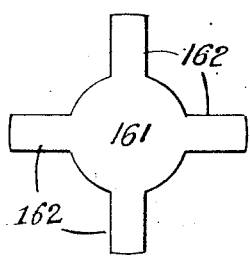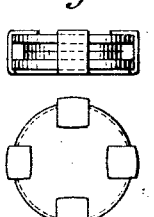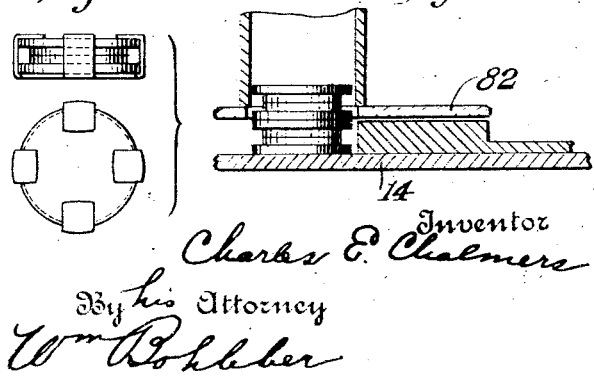

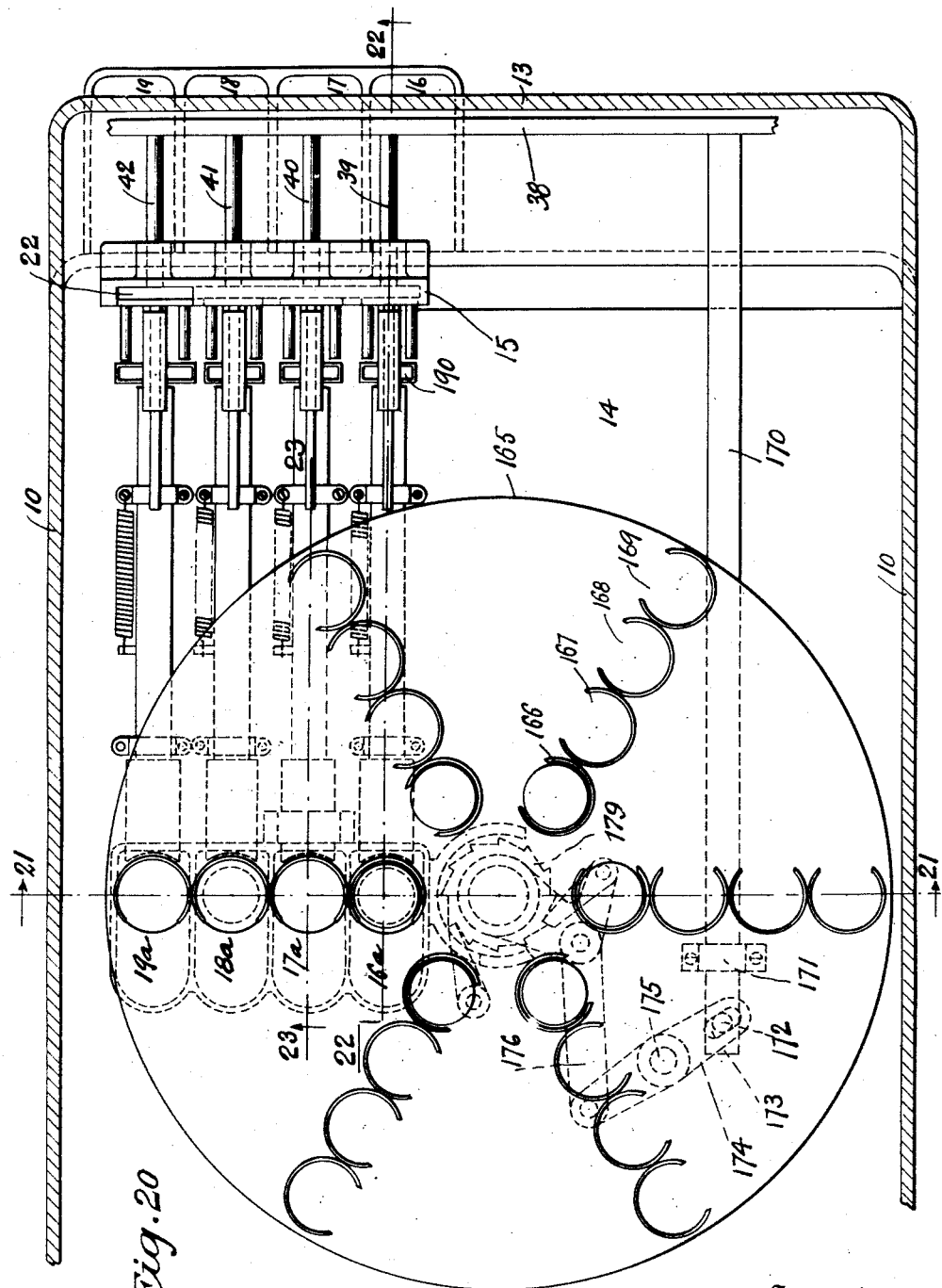

Inventor
Charles E. Chalmers
By his Attorney
Wm Rohleber

July 29, 1930.  C. E. CHALMERS  1,771,873
COIN CHANGING DEVICE
Original Filed Sept. 22, 1922  10 Sheets-Sheet 10

Inventor
Charles E. Chalmers
By his Attorney
Wm Rohleber

Patented July 29, 1930

1,771,873

UNITED STATES PATENT OFFICE

CHARLES E. CHALMERS, OF NEW YORK, N. Y.

COIN-CHANGING DEVICE

Application filed September 22, 1922, Serial No. 589,755. Renewed October 17, 1929.

The invention which constitutes the subject matter of this application relates to a change making machine and while the construction illustrated is specially designed to be used on street cars under the sole control of the motorman it is not limited to such use. One of the more important objects of the invention consists in devising an improved machine of this kind of compact form and simple construction which will not only receive the exact fare but return the necessary change whenever the passenger drops a coin therein of a denomination higher than the price of the fare.

Another important feature of the invention is the provision of improved change carriers capable of being removed from the machine to be replenished and adapted to receive packets or cartridges of coin containing the exact change required and capable of being ejected from these carriers by suitably actuated ejecting mechanism.

Another important feature of the invention is the provision of improved mechanism not only for receiving the exact fare, such as the 5¢ piece, but instrumentalities for returning the change for a dollar.

Another important feature of the invention is the provision of improved means in conjunction with the change making mechanism for issuing a transfer and at the same time stamping the time on such transfer as of the time when it was issued.

Another important feature of the invention is the provision of an improved coin chute common to a plurality of said change carriers together with improved means for actuating the change carriers in accordance with the denomination of the coin deposited in said chute.

Other features, objects and advantages of the machine will more fully hereinafter appear from the detailed description below taken in connection with the accompanying drawing in which:

Fig. 4 is an enlarged section taken alongside the line 2—2 of Figure 1 illustrating the actuating bar or crank in normal position;

Fig. 5 is a section similar to Figure 4 illustrating the actuating crank in the other extreme position from that illustrated in Figure 4;

Fig. 6 is a top plan view of one of the change carriers illustrating the position of the parts at the beginning of the handle stroke;

Fig. 7 is a view similar to Fig. 6 illustrating the parts at the beginning of the return stroke after having ejected the last coin in one of the pockets of one of the change carriers;

Fig. 8 is a section of the machine taken on the line 8—8 of Fig. 1 illustrating in normal position the mechanism employed for issuing a transfer to the passenger;

Fig. 9 is a view of the transfer feed roll mechanism showing the parts in the position which they assume at the beginning of their operation.

Fig. 10 is a front view of the feed roll and its operating mechanism.

Fig. 11 is a top plan view of a portion of the mechanism employed for effecting the change of a dollar.

Fig. 13 illustrates certain detail mechanism employed in connection with the change carriers.

Fig. 14 is a top plan view of one of the coin carriers after the pockets thereof have been removed and with the parts in position to effect a partial rotation of the carriers.

Fig. 15 is a view similar to Fig. 14 illustrating the coin ejector in the position it assumes after a partial rotation of the carrier has been effected to bring the succeeding pocket into position to eject change therefrom.

Fig. 16 is a section taken on the line 16—16 of Fig. 1.

Fig. 17 illustrates a form of blank employed for arranging the necessary change for twenty-five, fifty and one hundred cent pieces into cartridges.

Fig. 18 illustrates one of the change cartridges.

Fig. 19 illustrates the arrangement of the change when not loaded in the carriers in cartridge form.

Fig. 20 is a top plan view with the cover removed of a modified form of the invention in which all of the change is contained in a single change carrier.

Figure 1:
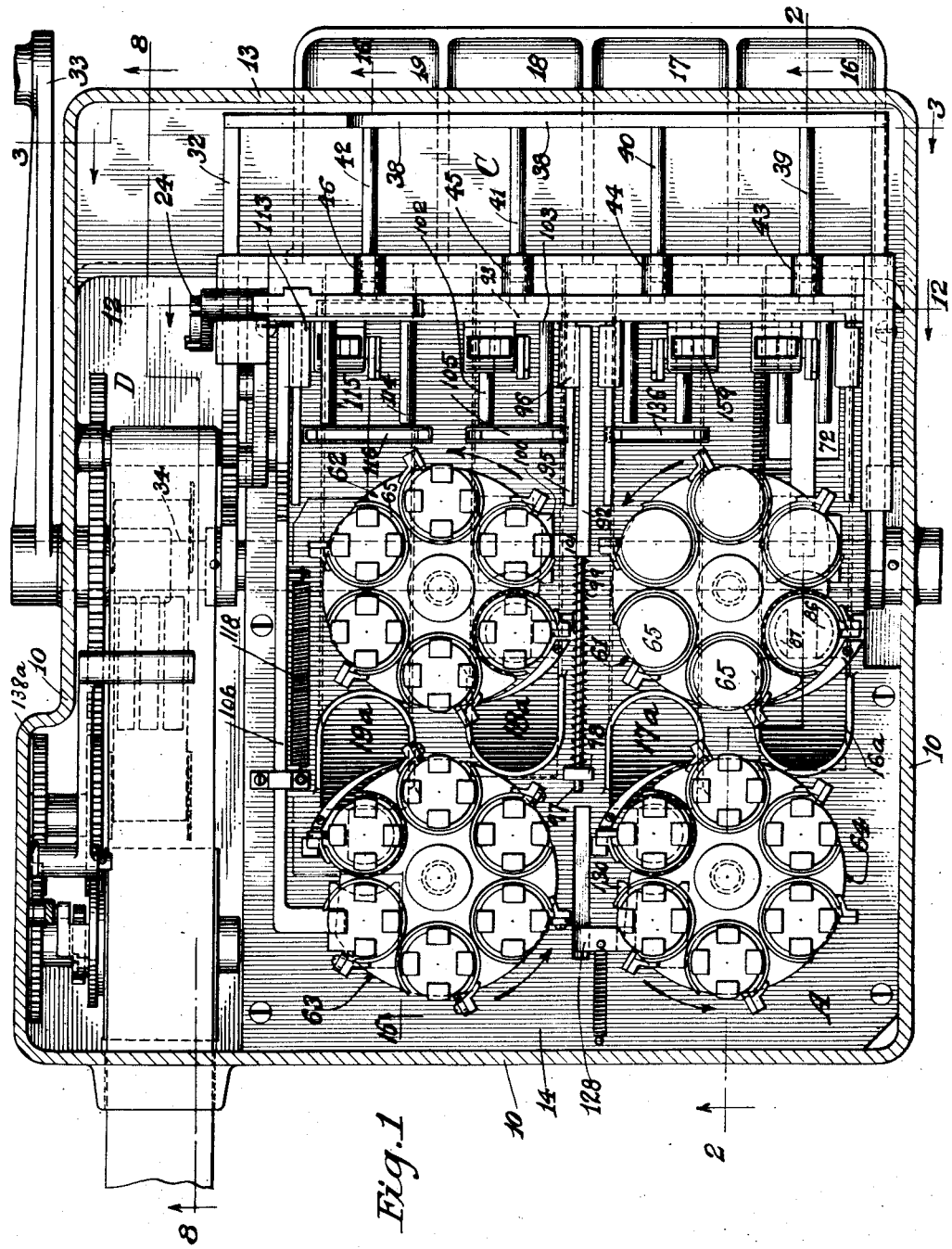
Fig. 1 illustrates a top plan view of the machine with the cover removed to show the internal mechanism.

Referring to the drawings in detail, and first to the form of the invention illustrated in Figures 1 to 16 inclusive, the reference numeral 10 designates the housing preferably provided at its top with a pivoted closure 11 (see Fig. 2) and at its side with a slidable closure 12, the former being employed to afford access to the change carriers and the latter to provide access to the compartment into which the coins deposited by the passengers are discharged by the machine. The machine is also provided with an offset portion 13, a horizontally arranged base plate 14, a vertical partition 15 and change receiving trays 16, 17, 18, and 19. The horizontally arranged base plate 14 and the vertical partition 15, while supporting in large part the mechanism of the machine may be said to divide the machine into a plurality of compartments, namely, a compartment A which contains the removable change carriers and the mechanism for ejecting coins therefrom, a compartment B which serves as a receptacle to receive the coins deposited by the passengers, and the compartment C in which is located the plungers for actuating, through the intermediary of the coins deposited, the ejecting and other associated mechanism located in the compartment A. There is also provided a compartment D laterally offset, so to speak, from the compartments A, B and C in which is located mechanism employed for stamping and issuing a transfer whenever that is desired.

The top closure 11 (see Fig. 2) is provided with a suitable slot 20 for receiving the various sized coins and a guide 21 is employed to direct said coins through said slot into the coin chute 22 the latter being located in the partition 15. For the purpose of arresting the coin in the guide 21, so that it can be properly inspected by the operator prior to its passage into the machine, I preferably employ an arm or stop 23 which normally covers the lower end of the slot 20, as clearly illustrated in Figs. 2, 4, 5 and 6. This arm is fixed to the shaft 23 about which it is pivoted as a center. To the journal of the arm 24 is also fixed an arm 25 on the lower end of which is a member 26 pivoted at 27 thereto. One end 28 of the member 26 is normally in engagement with a stud 29, due to the fact that said end is overbalanced by the other end 30. The end 30 is normally positioned in the path of a lug 31 projecting laterally from the reciprocating bar or rack 32. The parts are so constructed that the initial movement of the actuating handle 33 effects a movement to the left of the rack 32, as viewed from Figs. 2 and 4. This causes the lug 31 to engage the end 30 of the arm 26 thereby moving the arm 25 about the axis of the stub shaft 24 as a center. This movement of the arm 25 is continued until the end 30 of the arm 26 is moved out of the path of the lug 31. At that moment the stop 23 no longer impedes the progress of the coin through the slot 20 into the chute 22. After the stud 31 passes the arm 26 (to release the coin in the guide 21) the parts, including the stop 23 and arm 25 move again to normal position either by gravity or by a suitable spring (not illustrated). The use of the stop 23 enables the motorman or other operator to make a visual inspection of the coin to ascertain whether or not it is genuine. It may be stated that in the operation of the machine, assuming that the coin has been deposited in the guide 21, the initial movement of the actuating lever 33 serves only to withdraw the stop to enable the coin to be deposited into the coin chute.

The machine is provided with a main operating shaft 34. Any suitable mechanism may be employed to actuate the same, but I preferably employ the hand or foot operated lever or crank 33. The movement of the crank 33 from its initial or normal position indicated in Figures 1, 2, 4 and 8, to its other extreme position as indicated in Figure 5, serves not only to actuate the stop 23 as previously stated but also to perform a succession of operations which will be described below.

Any suitable mechanism may be interposed between the shaft 34 and stop 23 for actuating the latter, but I prefer the following. As before stated the housing is provided with a semi-partition or supporting wall 15 in which the coin chute 22 is located. This wall is provided with two slotted guide members 35 and 36 (see Figs. 3 and 12) within which the rack bars 32 and 37 are adapted to slide. These racks are preferably integral with and arranged at right angles to the transverse member 38 which is equipped with a plurality of coin-engaging plungers or fingers 39, 40, 41 and 42 located in the compartment C and adapted to reciprocate back and forth through perforations extending through the coin chute. Protuberances 43, 44, 45 and 46 are provided so as to present larger bearing surfaces for the plungers. Upon the driving shaft 34 and adjacent one end thereof is located a sector gear 47 which meshes with a pinion 48 driving the gear 49. The latter in turn meshes with the teeth on the rack 32 previously referred to. In proximity to the other end of the shaft 34 is a second sector gear 50 which meshes directly with the teeth of the rack 37. It will therefore be apparent from Figs. 4 and 5 that the initial movement of the operating crank 33 from its normal position indicated in Fig. 4, will actuate the arm 23 through the rack and gear connection just described to enable the coin to fall from the coin guide 21 into the coin chute 22. Gears 48 and 49 are interposed between the sector 47 and rack 32, whereas sector 50 meshes directly with the teeth on the rack 37. This is because the member 38, for reasons which will more fully hereinafter appear, is diagonally arranged with respect to the driving shaft 34. The rack 32 is really connected to an extension 38$^a$ of the member 38 and the rack 37 to a similar extension 38$^b$, as clearly illustrated in Figure 3.

As previously stated, the chute 22 is so arranged or stepped that the smallest sized coin (a dime) will pass to the lower end thereof, the coins next in size (a nickel, etc.) will be arrested in their passage down the chute 22 by means of the offsets 51, 52 and 53. These coins (dime, nickel, quarter, and half dollar) will stop respectively in the path of the coin engaging fingers 39, 40, 41 and 42. By way of example I will now describe the operation of this mechanism for the return of change after a dime has been properly deposited in the lower end of the coin chute 22.

The reference numeral 54 (see Figs. 4 and 5) designates an ejector provided with a head 55 having a perforation 56 therein. This ejector is actuated by the finger 39 only when the coin is in operative position as otherwise said finger merely passes through the perforation 56. When the finger 39 moves inwardly, by actuating the driving shaft 34, it presses the coin against the head 55 and moves the ejector to the left against the tension of the spring 57. There are two pintles 58 and 59 projecting forwardly or inwardly from the supporting wall 15 and located slightly below the periphery of the coin. So long as there is pressure on the coin through finger 39 the coin will not necessarily engage with the pintles 58 and 59. However, should the finger 39 be retracted slightly, as by a slight reverse movement of the crank 36, the coin will have a tendency to drop down on the pintles 58 and 59 but will be prevented thereby from falling into the coin retaining box B. When the ejector 54 has been moved inwardly beyond the end of the pins 58 and 59, through the intermediary of the coin, the change mechanism, to be described presently, will have been operated and the ejector momentarily locked in the inward position thus enabling the plunger to retreat, the coin to be deposited in the coin box B, and a nickel ejected from the change carrier and returned to the change receptacle 16.

Figure 2:
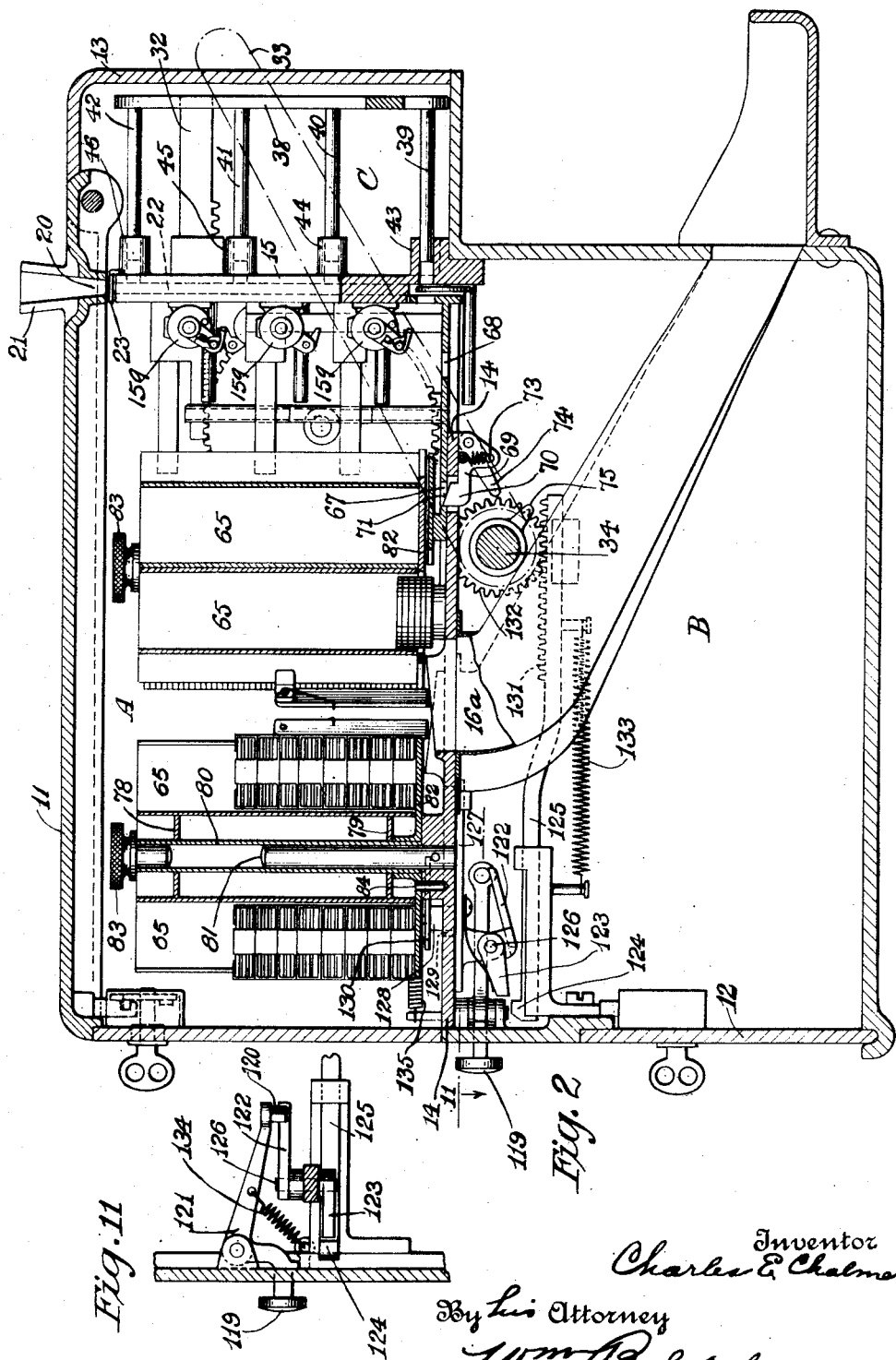
Fig. 2 is a section of the machine taken substantially on the line 2—2 of Figure 1.

As clearly illustrated in Fig. 1 there is provided a plurality of rotatably mounted and also removable change carriers 61, 62, 63 and 64. That particular carrier designated by the reference numeral 61 is loaded with nickels so as to make change for the ten cent pieces which may be deposited. The nickels are located in a plurality of pockets 65, the mechanical arrangements being such, as will more fully hereinafter appear, that when the supply of nickels in one pocket is exhausted the carrier 61 will be rotated to bring the next succeeding pocket 65 into position (see Figs. 4 and 5). The inner end of the ejector 54 is provided with a coin ejecting member or plate 66 for engaging the lowermost coin in the pocket and ejecting the same into the change chute 16$^a$ (see Figs. 4 and 5). The ejector 54 is provided with two perforations 67 and 68. Pivoted to the horizontal partition 14 of the housing is a spring pressed dog 69 provided with a nose 70 normally projected into the perforation 67 to limit the return movement of the ejector 54. The nose of the dog is provided with a cam face 71 to enable the ejector to move freely in its inward direction. When the ejector has been moved inwardly so that the coin is beyond the ends of the pins 58 and 59, as indicated in Fig. 5, the nose of the dog engages the wall of the perforation 68 so as to temporarily lock the ejector 54 and enable the return of the finger 39, and consequently remove the pressure of the latter upon the coin, thus permitting the coin to drop through the opening 72 in the base plate 14 into the coin box B. The dog is provided with a stud 73 and resting upon this stud, but pivoted preferably about the pivot of the dog, is an arm 74 the free end of which is located in the path of the projection 75 fixed to the driving shaft 34. From Figs. 4 and 5 it will be clear that in rotating the shaft 34 from its initial to its other extreme position the stud 75 merely cams the arm 74 upwardly, whereas in the reverse direction the engagement of the projection 75 with the arm 74 moves the latter downwardly and thereby retracts the nose of the dog from the perforation 68, thus enabling the ejector 54 to return to normal under the tension of spring 57 upon the pulling or the automatic return of the crank 33 to initial position. To guide the ejector 54 in its to and fro movement I employ a rectangular rod 76 projecting inwardly from the vertical partition 15 and a member 77 having a corespondingly shaped perforation to receive said rod is fixed upon the ejector 54, as clearly illustrated in Figs. 6 and 7.

The change carrier as before stated, comprises a plurality of cylindrical shaped pockets 65 (see Figs. 1 and 2), suitably secured to each other, as by the flanges 78 and 79 (see Fig. 2) which are centrally perforated to slide over the central tubular member 80, but rotatable relative thereto. The tubular member is adapted to receive the post 81 projecting upwardly from the base plate 14. The bottom 82 is rigid with the tubular member 80. This bottom member supports the pockets and coins therein. The upper end of the tubular member 80 is provided with a suitable handle 83 to lift the carrier from the machine for the purpose of loading or reloading the same. The bottom 82 is provided with a pin 84 fitting a correspondingly shaped hole in the base plate and serves a two-fold purpose. In the first place it locks the bottom 82 and tubular member 80 against rotation; and in the second place the carrier cannot be properly positioned in place unless this pin enters the socket and by being properly positioned is meant the bringing of the open portion 85 in the bottom 82 so that the coins may be fed therethrough to be ejected by the ejector element or plate 66 into the change chute 16ª. When in this position the lowermost coin in the particular pocket rests upon the two members 86 and 87 (see Figs. 6 and 7) projecting upwardly from the base. The distance between the top of the members 86 and 87 on the one hand and the lower face of the bottom 82 is slightly greater than the thickness of the coin (in this case a nickel) thus enabling the latter to be separated from the stack and ejected into the change chute. The horizontal distance between the members 86 and 87 is slightly greater than the width of the inner end of the ejector 54 so that the later may pass between the same in ejecting the coin.

Pivoted at 88 to the outer edge of each coin pocket (see Figs. 4 to 7) is a spring pressed member 89, the lower end of which normally engages with the lowermost coin in the particular pocket. The particular spring-pressed member which is secured to the pocket from which the coins are being ejected is normally located between the cam 90 and stop 91 which are fixed to the base, (see Figs. 6 and 7), thus locking the stock or change cylinder as a whole against rotation. When, however, the last coin is ejected from the pocket the spring-pressed member 89 is projected inwardly (see Fig. 7) behind the ejector plate 66 and out of the path of the stop 91. Consequently as the ejector 54 is repelled to normal position a partial rotation of the change cylinder is effected. As the change cylinder is being rotated the next succeeding spring pressed member 89 rides over the outer surface of the cam 90 until it drops into the space between the cam 90 and stop 91, thereby locking the change cylinder against further rotation in either direction as long as there are coins in said succeeding pocket, and so on until all of the change coins are exhausted from the pockets of the change cylinder. It may be stated that the amount of stock (change) that the machine is required to carry can be readily determined or calculated by those in charge. In any event, the machine employed for any trip should carry enough change so that no particular carrier would become exhausted. Should one of the carriers become exhausted it would only mean that the spring-pressed member 89 on the first pocket exhausted would ride over the cam 90 as previously described and abut against the stop 91 but if there are no coins in this particular pocket the lower end of the spring pressed arm would be moved inwardly into the path of inward movement of the coin plate 66 and thus prevent the crank 33 from being further actuated upon the dropping of a dime in the coin chute. The conductor or operator would instantly know that one of the carriers was exhausted.

Referring to Fig. 1 it will be noted that the change coins in the change carrier or cylinder 61 are all separately located therein. The change coins in carriers 62, 63 and 64 are preferably done up in packages of twenty cents, forty-five cents and ninety-five cents respectively so that the proper change will be returned upon a single operation of the machine. It will be understood however that the machine can be readily designed, in view of the disclosure herein, to return any amount of change and therefore the invention is not limited to the return of five cent pieces or multiples thereof.

For the sake of compactness, the mechanism for actuating the change carriers 62, 63 and 64 is somewhat differently arranged as compared with the mechanism which actuates the carrier 61. However only that portion of the mechanism which differs from the mechanism employed for actuating carrier 61 need be described.

Figure 3:
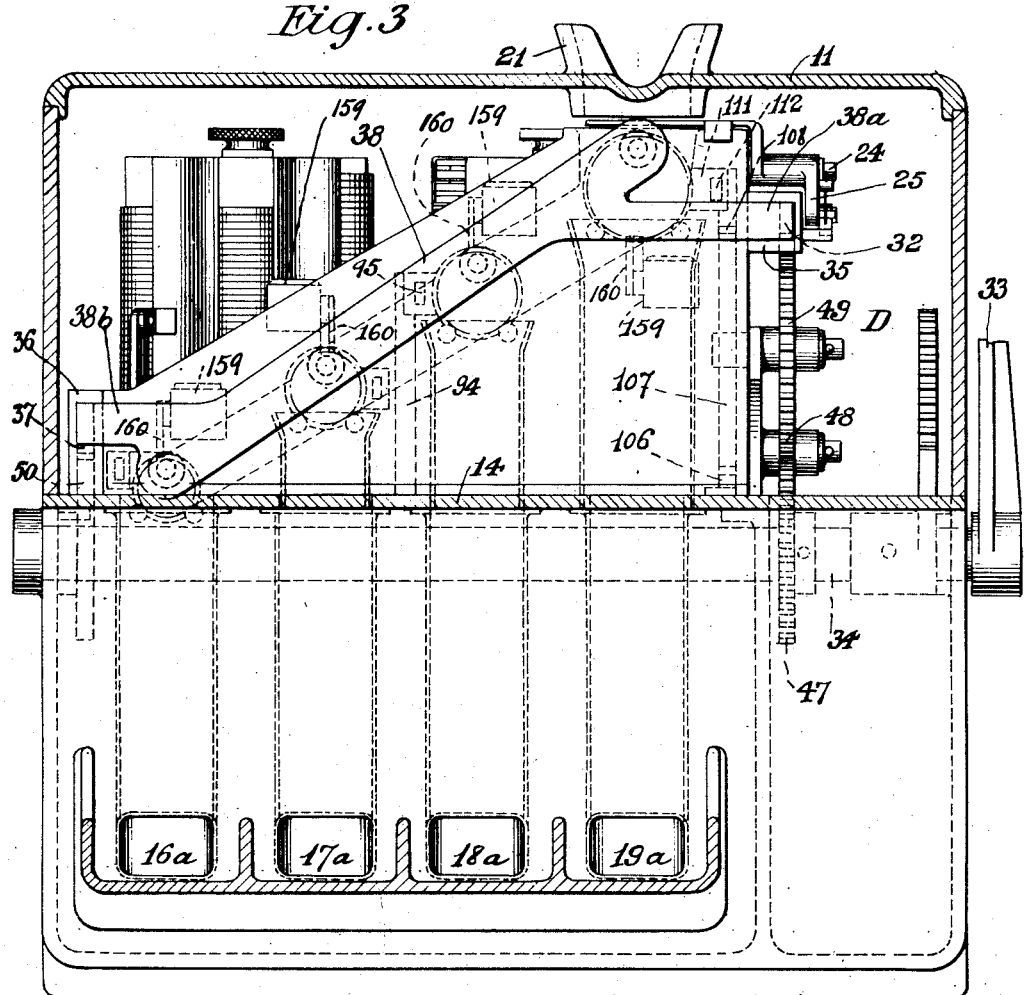
Fig. 3 is a section of the machine taken on the line 3—3 of Figure 1 illustrating the coin chute and its associated mechanism.
Figure 12:
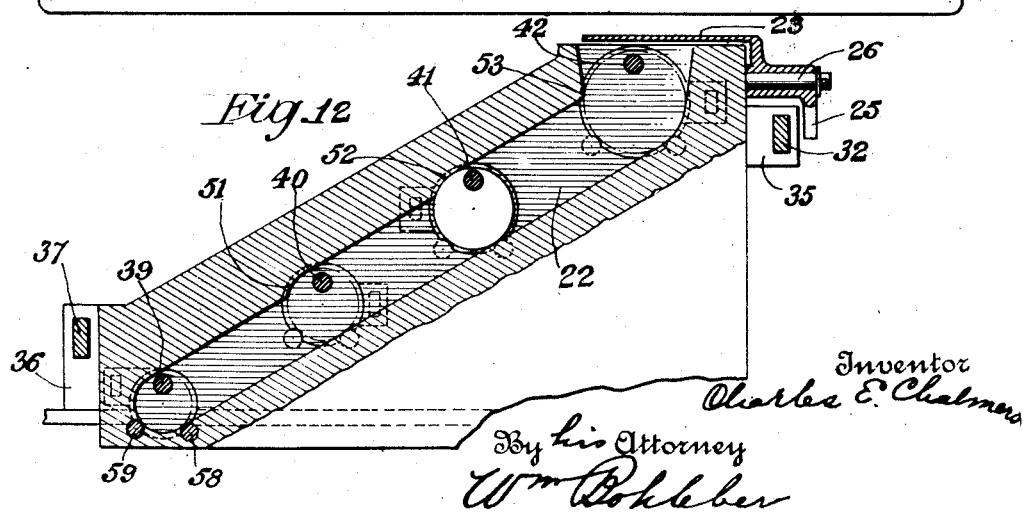
Fig. 12 is a longitudinal section of the vertical partition and coin chute taken on the line 12—12 of Fig. 1.
Figure 21:
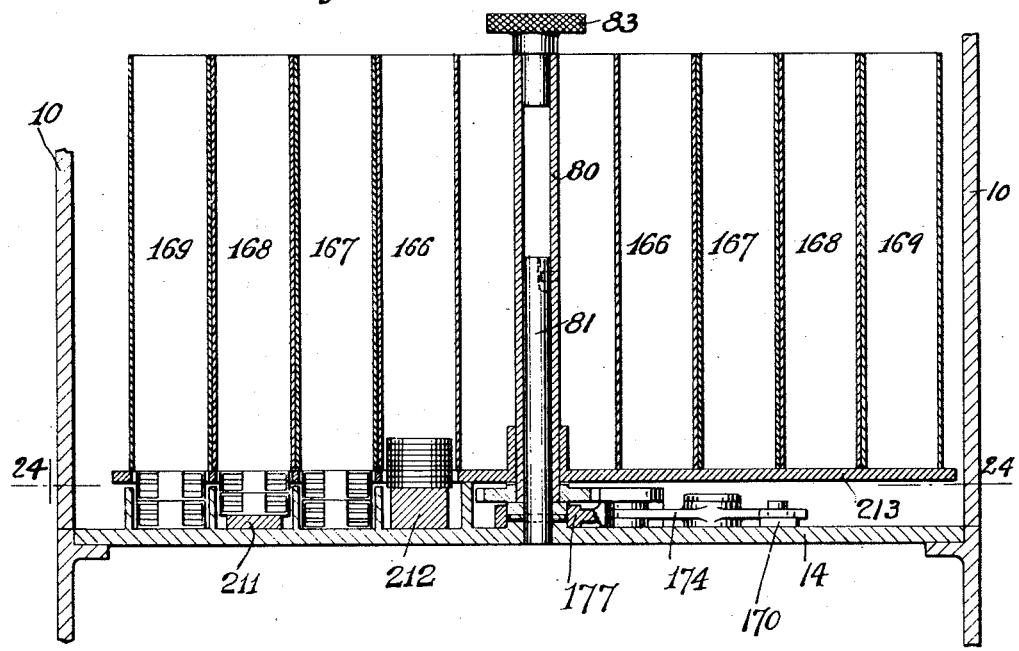
Fig. 21 is a section on the line 21—21 of Fig. 20.

The carrier 62 which is provided with pockets 65 for containing the proper change for a quarter is actuated by means of an ejector 92 similar to the ejector 54 but connecting the ejector 92 with the head 93 is a bar 94 (see Figs. 1 and 3). This bar or equivalent mechanism is necessary because of the height of the coin chute 22 at this point. For the purpose of guiding the ejector 92, head 93 and bar 94 in their to and fro movement I preferably employ a rectangular rod 95 which snugly fits a correspondingly shaped perforation in the member 96 projecting from the head 93. The ejector 92 is provided with an extension 97 the extreme end of which is guided by a perforated stud 98. The spring 99 automatically returns the ejector 92 to normal position as illustrated in Fig. 1. This ejector is provided with a plate 100 secured to the laterally projecting member 101 for ejecting the change into the change chute 18ª. Pins 102 and 103 are provided which serve the same purpose as the pins 58 and 59 previously described. When the ejector head 93 has been moved inwardly by the plunger 41 beyond the pins 102 and 103 through the intermediary of the coin (quarter) deposited in the chute 22 the change return mechanism will have been operated, and the ejector momentarily locked thus enabling the coin to be deposited in the coin-way 105 through which it passes into the coin receptacle in compartment B. The additional mechanism necessary to render the change carrier 62 operative is the same as the mechanism described in connection with change carrier 65 and to avoid prolixity of description need not be described.

The parts for actuating the fifty cent change carrier 63 comprises an ejector 106 in the form of a rack. This rack is in mesh with a gear 107 which is actuated by the rack 108. When the fifty cent piece is dropped into the coin chute 22 it passes downwardly therein but is arrested by the offset 53 indicated in Fig. 12 and in front of the plunger 42, and back of the coin is the slidable head 110. The ejector rack 106, gear 107 and rack 108 are employed in lieu of a bar similar to bar 94 for mechanical reasons, that is because of the greater distance between the head 110 and ejector 106. The rack 108 is secured to an extension 111 on the head 110 and the latter is guided in its to and fro movement by means of the rectangular rod 112 which projects from the partition 15 and the correspondingly slotted member 113 mounted upon or connected to the head 110. Pintles 114 and 115 similar to the pintles 58 and 59 are also employed, and the coin-way 116 functions in the same respect as coin-way 105 previously described. It will be noted however in operation that the ejector 106 and plate 106ª moves in a direction opposite to the ejectors 54 and 92 to eject the change into the chute 19ª and finally into the change receptacle 19. A suitable spring 118 serves to restore the ejector 106 to normal position.

The change carrier 64 contain pockets 65 for the change of a dollar. It frequently happens that it is necessary to change a dollar bill. In this case, the bill is given to the motorman who pushes the knob 119. This throws the stud 120 of the bell crank lever 121 out of the path of the arm 122 thus enabling the pawl 123 to drop behind the lugs 124 on the rack 125. The arm 122 and pawl 123 are fixed to the same shaft 126 pivotally mounted upon the ejector 127 which is provided with a shank or neck portion 128 projecting upwardly through the slot 129 in the base plate 14, and upon the neck 128 is secured the ejector plate 130 which engages with and ejects the change from the change carrier 64. The teeth 131 on the ejector operating rack 125 are in mesh with a gear 132 on the main operating shaft 34 so that the change ejecting mechanism is actuated by the operating lever 33. The actuating parts are restored to normal position by the return of the operating lever 33 either manually or by means of a suitable spring 133 employed for that purpose. The bell-crank lever 121 is restored to normal position by means of a suitable spring 134. This brings the lug 120 thereon into the return path of the arm 122 and serves to came the latter downwardly to raise the pawl 123 out of the path of the stud 124 on the rack bar 125 and thus enable said rack to move back and forth until the knob 119 is again pushed by the operator. The ejector is restored to normal position by means of a spring 133. The change is ejected into the change chute 17ª.

When the exact fare is deposited in the coin chute (a nickel in this case) no change, of course, will be returned. Therefore no change carrier is necessary nor any mechanism for actuating the same. Instead the nickel is merely deposited into the coin box B through the coin way 136. The mechanism for moving the nickel so that it will be deposited in the said coin-way is, however, similar to the mechanism employed for moving the twenty-five and fifty cent pieces in position to be discharged into their respective coin-ways, as will be understood.

As previously stated, mechanism is provided in the machine for issuing a transfer to the passenger whenever that is desired. This mechanism for issuing transfers is clearly illustrated on Figs. 1, 8, 9 and 10. Referring to these figures, the reference numeral 137 designates a sector gear fixed to the main shaft 34 of the machine and in mesh with a gear 138, which through gear 138ª actuates a gear 139 mounted upon the shaft 140 which is employed for supporting the feed roll 141 freely mounted upon said shaft 140 and fixed to rotate with the gear 139 is a ratchet wheel 142 and secured to the feed roll is a cam member 143 provided with an offset 144 and also carrying a pawl 145 normally held out of engagement with the ratchet 142 by the arm 146 which rides upon a stud 147 projected laterally from the pivoted arm 148 as clearly illustrated in Fig. 8. It will, of course, be understood that the pawl 145 and the arm 146 are pivoted about the same center and movable in unison with each other. When the lever 148 is moved to the left (see Figs. 8 and 9) the stud 147 will be withdrawn from under the arm 146 enabling the pawl 145 to engage the ratchet 142. Hence, the rotation of gear 139 will effect a positive rotation of the feed roll 141 for one complete revolution of the latter thereby feeding the transfer ticket tape 149 for a predetermined distance. The release of the arm 148 enables it to return to normal position under the tension of the spring 150. Just as the cam 143 has completed a revolution the arm 146 rides upon the stud 147 thereby withdrawing the pawl 145 from the ratchet 142 thereby stopping the rotation of the feed roll. As heretofore stated, the member 143 is provided with a depression 144 the purpose of which is to enable the member 151 to act upon the printing wheel 152 for the purpose of stamping the time when the transfer ticket was issued. This is effected by the extension 153 of the arm 154 dropping into the depression 144 of the cam 143.

Located above the feed roll is a pivoted member 155 for pressing the transfer ticket tape in engagement with the feed roll 141 so that the tape will be fed by the latter as will be understood. Any suitable mechanism may be employed to rotate the die or printing wheel 152. The reference numeral 156 designates a guide for the transfer ticket tape to the time printing mechanism and the slot 157 in the closure 158 of machine is employed for guiding the ticket transfer tape after it has been properly printed. From the foregoing it will be seen that by moving the pivoted lever 148 to the position indicated in Fig. 9 and by actuating lever 33 as previously described a transfer ticket will be issued by the machine to the passenger having stamped thereon the time when it was issued. It, of course, will be understood that any other matter may be printed or otherwise stamped on the ticket.

The change return chutes or conveyors 16ª, 17ª, 18ª and 19ª discharge respectively into the change receptacles 16, 17, 18 and 19. Counters 159 are preferably employed to register the number of times the ejectors have been actuated. These counters are preferably actuated by the ejector heads engaging with and moving the arms 160. As the heads return to normal position the arms are cammed out of their path as will be clearly apparent from Fig. 2.

In Fig. 17, I have illustrated a blank for forming the change required into cartridges. This blank comprises a body portion 161 equal in diameter to the largest coin that is to be wrapped thereby. The fingers 162 are adapted to be bent around the pack of coins and engages the opposite side thereof as clearly illustrated in Fig. 18. It will be understood, however, that these cartridges, although desirable, are not essential to the operation of the machine, as the change coins can be readily ejected when properly stacked in the pockets as shown in Fig. 19.

In Figures 20 to 24 both inclusive, I have illustrated a modified form of the invention in which only a single change carrier is employed for containing the change for various coins which are deposited in the coin chute. The parts designated by the reference numerals 10, 12, 13, 14, 15, 16, 17, 18, 19, 16ª, 17ª, 19ª, 22, 33, 34, 38, 39, 40, 41 and 42 refer to parts which correspond to the parts similarly designated in Figs. 1 to 19 inclusive. The change carrier 165 comprises a plurality of pockets 166 for containing coins for the change of a dime; a plurality of pockets 167 for containing coins for change of a dollar; a plurality of pockets 168 for containing change for a 50¢ piece. It will be noted that these pockets just referred to radiate from the center of the carrier and in the order mantioned and that there are six pockets for each of the change coins circularly arranged around the axis of the carrier. Connected to the bar 38 is a reciprocating rod 170 held during its reciprocation by the clip 171 against lateral movement. The outer end of this rod 170 is provided with a pin 172 which engages within the slot 173 of the lever 174, the latter being pivoted at 175. The other end of the lever 174 is pivoted to one end of a link 176, the other end of said link being, in turn, pivoted to a member 177 (see Fig. 24) movable by the said link abount the axis of the shaft 81 as a center. Upon this member 177 is pivoted a spring pressed pawl 178 adapted to engage a ratchet 179 fixed upon the lower end of the tubular member 80 of the change carrier. The mechanism located between the main shaft 34 and the actuating bar 38 is the same as that fully illustrated and described in connection with Figs. 1 to 6 inclusive, and is therefore not shown in this modified form. Remembering, however, that this operative mechanism is located between said shaft and bar, it will be seen that upon movement of the actuating lever 33, the bar 38 will be moved to the left carrying with it the rod 170, the lever 174, link 176 and member 177, thereby effecting a partial rotation of the change carrier about the post 81 as a center. The construction is such that each time that the lever 33 is actuated, a partial rotation of the change carrier will be effected. To prevent reverse rotation of the change carrier, a spring pressed pawl 180 is employed engaging with the ratchet 179.

Figure 22:
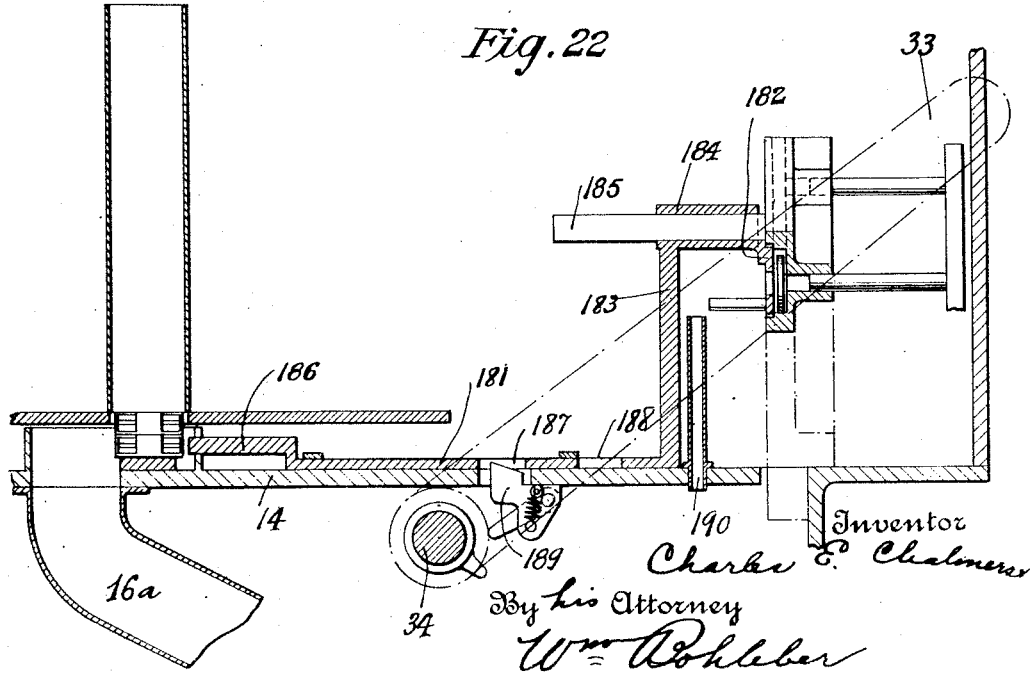
Fig. 22 is a section on the line 22—22 of Fig. 20.

Referring to Fig. 22, the reference numeral 181 designates an ejector provided with a head 182. Connecting the ejector 181 and the head 182 is an arm 183 provided with a tubular guide member 184, the latter telescoping over the guide rod 185. The ejector is further provided with a plate 186 which engages with and ejects the change from the pockets 166 into the change chute 16ª. The ejector 181 is provided with two perforations 187 and 188 similar to the perforations 67 and 68 previously described in connection with Figs. 1 and 6. These perforations are engaged by the dog 189 also similar to the dog 69 previously described. After the change has been ejected, the coin deposited in the coin chute is discharged into a coinway 190.

Figure 23:
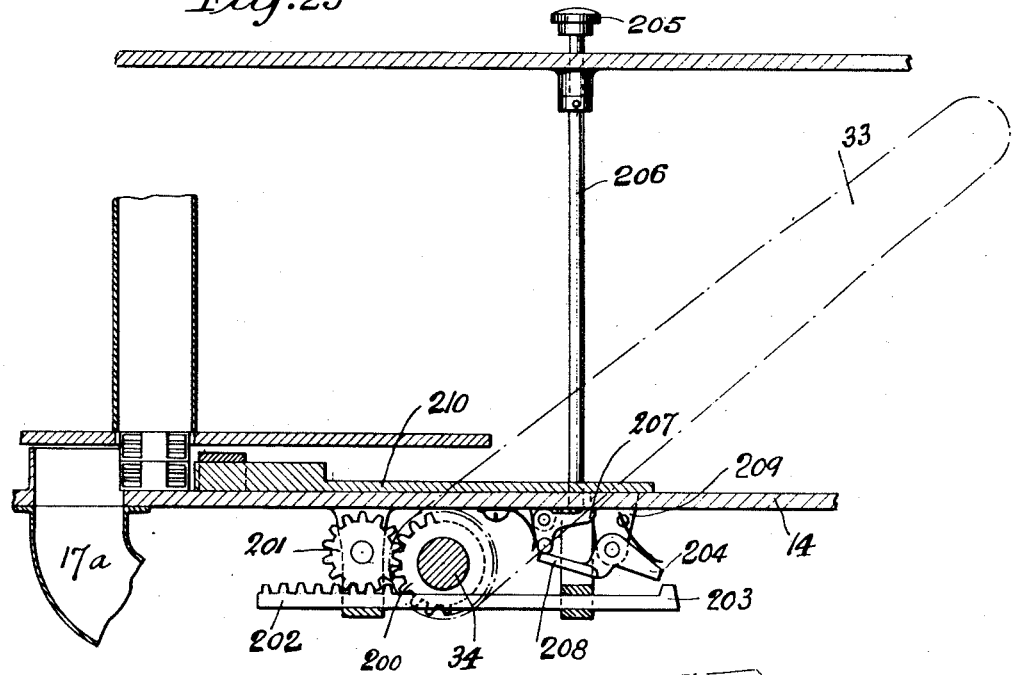
Fig. 23 is a section on the line 23—23 of Fig. 20.
Figure 24:
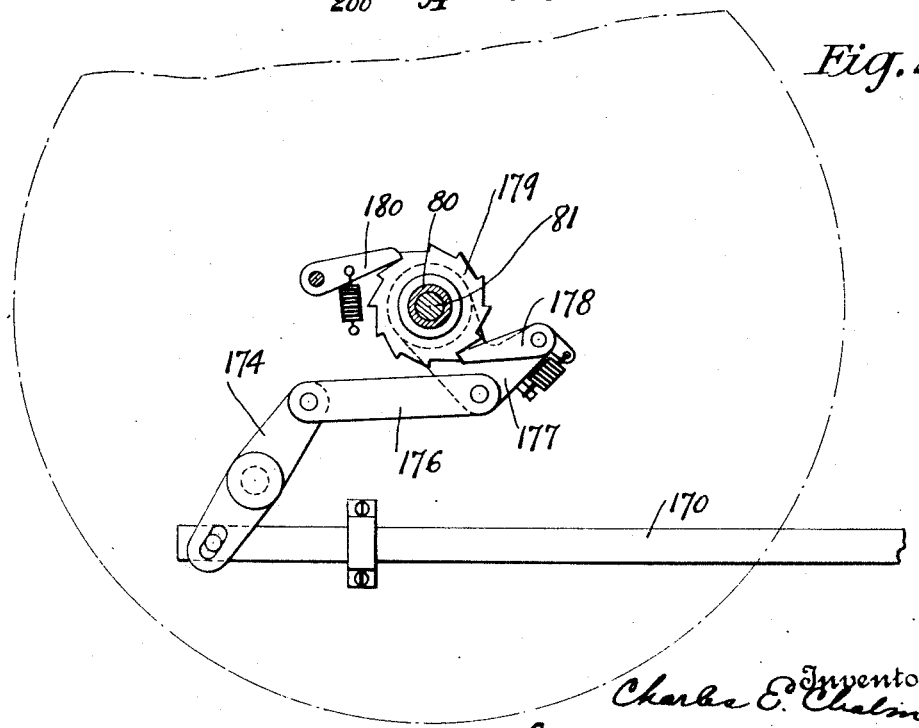
Fig. 24 is a section on the line 24—24 of Fig. 21.

In Fig. 23 is illustrated the mechanism for returning the change of a dollar and comprises a gear 200 fixed to the main shaft 34 and meshing with a gear 201 suitably pivoted to the base plate 14. This gear 201 meshes with the teeth on a rack 202. This rack is provided with a stud 203 which is adapted to engage with a spring pressed pawl 204 when the latter is released by pushing down upon the knob 205 of the rod 206. That is to say, the downward movement of the rod 206 moves the bell crank lever 207 out of engagement with the arm 208 constituting a part of the pawl 204. This pawl is pivoted to a member 209 which extends upwardly to the base plate 14 and is connected to the ejector 210. Consequently, when the pawl 204 is in engagement with the stud 203, the movement of the rack 202, by actuating the lever 33, will move the ejector 210 to the left to eject the change from one of the pockets 167 into the change chute 17ª.

The mechanism for returning change for twenty-five and fifty cent pieces is similar to that required for returning change for a ten cent piece; hence it is not necessary to describe this. It may be stated, however, that suitable blocks 211 and 212 are mounted upon the base plate 14 to prevent jamming of the coins when the pockets are rotated relative to the bottom 213. With reference to the construction shown in Figs. 20 to 24 inclusive it will be observed that the pockets 166, 167, 168 and 169 all terminate at their bottoms in the same plane. If the blocks 211 and 212, or equivalent means, be not provided the lowermost coins in the pockets 166, 168 would drop down too far and thus prevent the rotation of the carrier; and this is what is meant by "jamming."

From the foregoing it will be seen that I have devised change mechanism which is simple in construction, easy to manipulate and not liable to get out of operation. The constructions of my invention illustrated and described herein are merely the preferred embodiments of my invention and it is to be expressly understood that I do not limit myself thereto as many changes may be made in points of detail and other embodiments resorted to without deviating from the true spirit and scope of my invention.

What I claim is:

1. A change making machine comprising a plurality of rotatable change carriers, a chute common to said carriers for receiving the coins deposited for change and provided with means for locating the coins of different denominations in certain positions therein, and means common to the carriers and in alignment with the coin positioned in the chute for actuating the carriers through the intermediary of the coins deposited in said chute to discharge the required change.

2. A change making machine comprising a plurality of rotatable change carriers provided with a plurality of change pockets, a chute common to said carriers for receiving the coins deposited for change and provided with means for locating the coins therein of different denominations in certain positions, and means in alignment with the coin positioned in said chute common to the carriers and rendered operative by the deposited coins in said chute for ejecting change from one of the pockets of said carriers, in combination with means for automatically rotating any one of said carriers when the change has been exhausted from one of the pockets thereof.

3. A change making machine comprising a plurality of movable change carriers each provided with a plurality of change pockets, a common chute for receiving coins of different denominations deposited, and provided with means for locating the coins in certain positions and means rendered operative by the depositing of a coin in said chute for ejecting change from a pocket of any carrier, in combination with means for automatically moving said carrier when said pocket is exhausted to bring another pocket into operative relationship to said ejecting mechanism.

4. A change making mechanism comprising a plurality of movable change carriers each provided with a plurality of change pockets, common means for receiving deposited coins of different denominations and having provisions for locating the coins in certain positions, means rendered operative by the deposit of a coin in the first mentioned means for ejecting change from one of the pockets, and means for automatically moving any one of said carriers when a pocket therein is exhausted to bring another pocket into operative relationship to said ejecting mechanism.

5. A change making machine comprising a plurality of movable change carriers each provided with a plurality of change pockets therein, common means for receiving deposited coins of different denominations and having provisions for locating said coins in certain positions, ejecting mechanism located in operative relationship to the change in a pocket of each carrier, means rendered operative by the deposit of a coin in said first mentioned means for actuating said ejecting mechanism, and means for automatically moving a carrier when a pocket therein is exhausted to bring another pocket into operative relationship to said ejecting mechanism.

6. A change making machine comprising a plurality of rotatable change carriers each provided with a plurality of change pockets therein, common means for receiving deposited coins of different denominations and having provisions for locating said coins in certain positions, ejecting mechanism located in operative relationship to pocket of each carrier to discharge change therefrom, means rendered operative by the deposit of a coin in the first mentioned means for actuating said ejecting mechanism, and means for automatically rotating a carrier when a pocket is exhausted to bring the coins of another pocket into operative relationship to said ejecting mechanism.

7. A change making machine comprising a plurality of rotatable change carriers each provided with a plurality of change pockets therein, a common chute for receiving deposited coins of different denominations and having provisions for locating the coins in certain positions therein, an ejector for each carrier located in operative relationship to one of the pockets thereof, means common to said ejectors and rendered operative by the deposit of coins of different denominations in the first mentioned means for actuating that ejector corresponding to the denomination of coin deposited, and means for automatically rotating said carriers to bring the succeeding pockets in the carriers into operative position with respect to the ejectors.

8. A change making machine comprising a plurality of change carriers, a common chute for receiving deposited coins of different denominations and provided with means for locating the coins therein, mechanism for each of said carriers for ejecting change therefrom, mechanism rendered operative by the deposit of coins into said chute for actuating said ejecting mechanism, means for normally arresting the coin before it passes into the coin chute to enable it to be inspected, and means actuated by said mechanism for rendering the coin arresting means inoperative.

9. A change making machine comprising a common chute for depositing coins of different denominations, and having provisions for locating the coins in certain positions therein, a plurality of movable change carriers, an ejector for each of said carriers, and normally inoperative mechanism common to all of said ejectors for actuating the same, said mechanism being provided with means cooperating with a coin while in said first mentioned means to render the same operative to actuate one of said ejectors.

10. A change making machine comprising means for receiving deposited coins, a change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means operable upon the return of the ejector to automatically replace in ejecting position an empty change pocket with another pocket.

11. A change making machine comprising means for receiving deposited coins, a change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means operable by the ejector upon its return movement to automatically replace the empty change pocket in ejecting position with another pocket.

12. A change making machine comprising means for receiving deposited coins, a change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means upon each pocket engaged by the ejector upon its return movement to automatically replace the empty change pocket in ejecting position with another pocket.

13. A change making machine comprising means for receiving deposited coins, a change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means upon each pocket normally pressed into the pocket and held outside of the pocket by the change coins within the pocket, said means being engaged by the ejector upon its return movement when the change pocket is empty to automatically replace in ejecting position an empty change pocket with another pocket.

14. A change making machine comprising means for receiving deposited coins, a change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and a pivoted lever upon each pocket normally pressed into the pocket and held outside of the pocket by the change coins within the pocket, said lever extending into the path of the ejector upon its return movement to automatically replace in ejecting position an empty change pocket with another pocket.

15. A change making machine comprising means for receiving deposited coins, a rotatable change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means operable upon the return of the ejector to automatically rotate the carrier to replace an empty change pocket in ejecting position with another pocket.

16. A change making machine comprising means for receiving deposited coins, a rotatable change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means operable by the ejector upon its return movement to automatically rotate the carrier to replace an empty change pocket in ejecting position with another pocket.

17. A change making machine comprising means for receiving deposited coins, a rotatable change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means upon each pocket engaged by the ejector upon its return movement to automatically rotate the carrier to replace an empty change pocket in ejecting position with another pocket.

18. A change making machine comprising means for receiving deposited coins, a rotatable change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and means upon each pocket normally pressed into the pocket and held outside of the pocket by the change coins within the pocket, said means being engaged by the ejector upon its return movement when the change pocket is empty to automatically rotate the carrier to replace an empty change pocket in ejecting position with another pocket.

19. A change making machine comprising means for receiving deposited coins, a rotatable change coin carrier having a plurality of change pockets one of which is in ejecting position, a sliding ejector for said carrier to eject change coins from one pocket having an ejecting and return movement, means including the deposited coin for operating the ejector to eject one or more change coins from the pocket, and a pivoted lever upon each pocket normally pressed into the pocket and held outside of the pocket by the change coins within the pocket, said lever extending into the path of the ejector upon its return movement to automatically rotate the carrier to replace an empty change pocket in ejecting position with another pocket.

In testimony whereof, I have hereunto set my hand this 21st day of September, 1922.

CHARLES E. CHALMERS.